No. 661,882. Patented Nov. 13, 1900.
R. C. LIVESAY, H. F. CRANDALL & E. W. BURGESS.
CORD KNOTTER FOR SELF BINDING HARVESTERS.
(Application filed Sept. 29, 1899.)
(No Model.) 2 Sheets—Sheet 1.
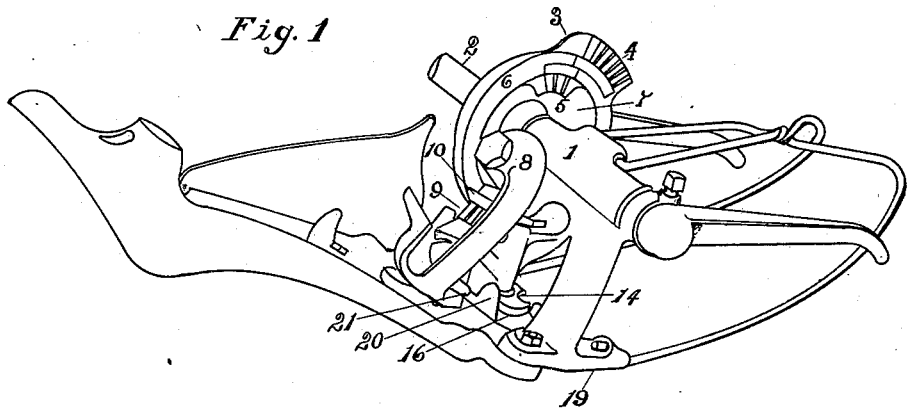
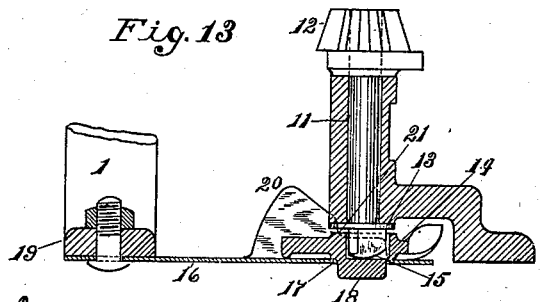
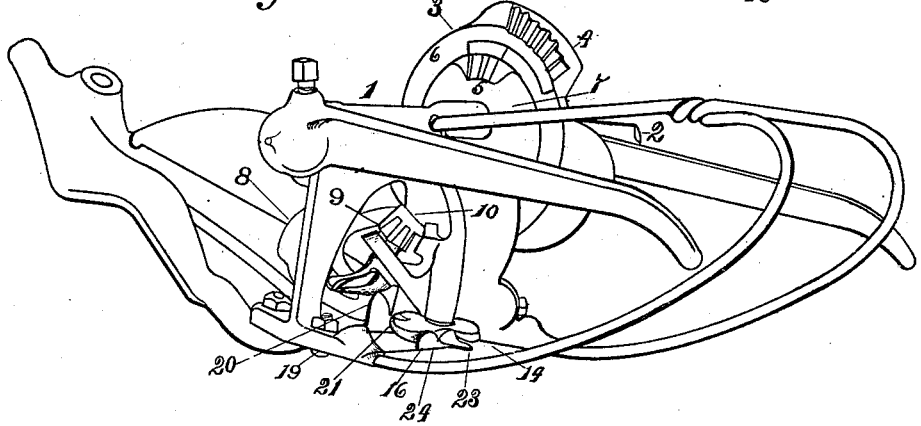
Witnesses
Harold Kater
J. O. Holmes
Inventors
Robert C. Livesay
Henry F. Crandall
Edward W. Burgess
By their Attorney
E. W. Burgess No. 661,882. Patented Nov. 13, 1900.
R. C. LIVESAY, H. F. CRANDALL & E. W. BURGESS.
CORD KNOTTER FOR SELF BINDING HARVESTERS.
(Application filed Sept. 29, 1899.)
(No Model.) 2 Sheets—Sheet 2.
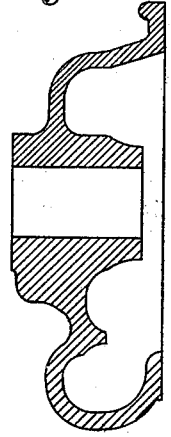
Fig. 4
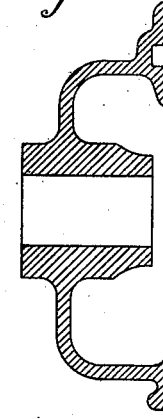
Fig. 5
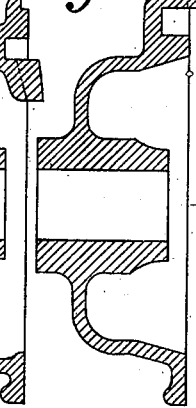
Fig. 6
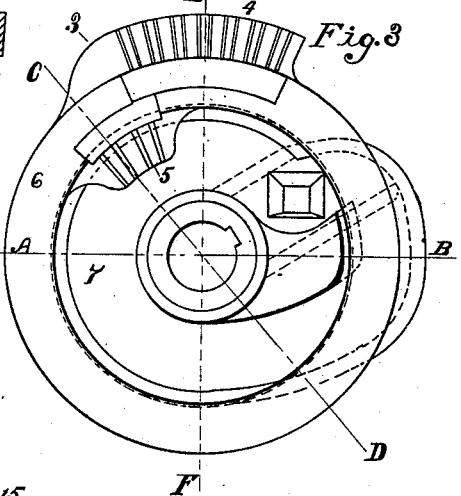
Fig. 3
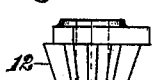
Fig. 7
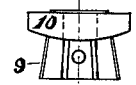
Fig. 8
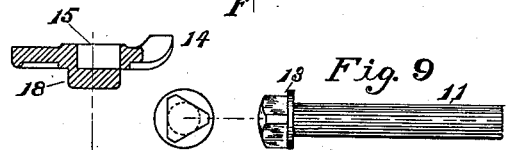
Fig. 10  Fig. 9  Fig. 11
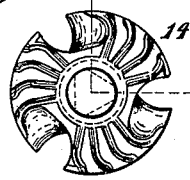
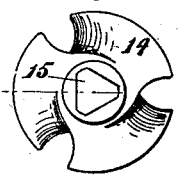
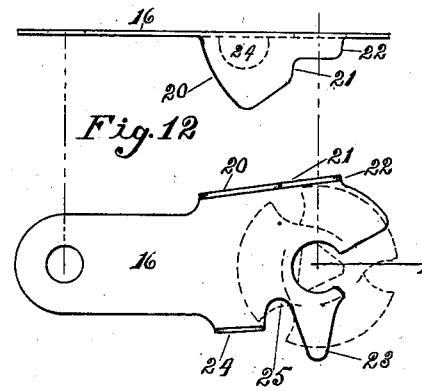
Fig. 12
Witnesses.
Harold Slater
J. O. Holmes
Inventors
Robert. C. Livesay
Henry. F. Crandall
Edward. W. Burgess
By their Attorney
E. W. Burgess

UNITED STATES PATENT OFFICE.

ROBERT C. LIVESAY, HENRY F. CRANDALL, AND EDWARD W. BURGESS, OF MILWAUKEE, WISCONSIN, ASSIGNORS TO THE MILWAUKEE HARVESTER COMPANY, OF SAME PLACE.

CORD-KNOTTER FOR SELF-BINDING HARVESTERS.

SPECIFICATION forming part of Letters Patent No. 661,882, dated November 13, 1900.

Application filed September 29, 1899. Serial No. 732,140. (No model.)

*To all whom it may concern:*

Be it known that we, ROBERT C. LIVESAY, HENRY F. CRANDALL, and EDWARD W. BURGESS, citizens of the United States, residing at Milwaukee, in the county of Milwaukee and State of Wisconsin, have invented certain new and useful Improvements in Cord-Knotters for Self-Binding Harvesters, of which the following is a specification.

Our improvements relate to devices for holding and uniting the cord in cord automatic binding-machines, and have particular reference to the simplicity of the mechanisms for this purpose, the ease with which they can be manufactured in large quantities without special care, their freedom from rapid wearing movements, and the absence of complicated parts requiring accurate and frequent adjustment. We attain these objects by the use of the mechanisms shown in the accompanying drawings, in which—

Figures 1 and 2 are perspective views of our knotter mechanism. Fig. 3 is an elevation of the knotter cam-wheel. Figs. 4, 5, and 6 are cross-sections of Fig. 3 on the lines A B, C D, and E F, respectively. Fig. 7 is a plan and elevation of the pinion for driving the cord-holder disk. Fig. 8 is a plan and elevation of the pinion that drives the knotter-hook. Fig. 9 represents the cord-holder-disk-driving shaft. Fig. 10 is a bottom plan and cross-section of the cord-holder disk. Fig. 11 is a top plan of the cord-holder disk. Fig. 12 is a plan and elevation of the plate-spring that forms a part of the cord-holder mechanism. Fig. 13 is a section through the cord-holding mechanism in a plane which passes through the axis of the shaft thereof.

Similar numerals refer to similar parts throughout the several figures.

The knotter-frame 1 has the usual long horizontal bearing and is mounted on the shaft 2 of the binder, usually called the "knotter-shaft." A cam-wheel 3 is also mounted upon this shaft and keyed thereto, so as to receive motion therefrom. This cam-wheel is provided with a segment of gearing 4 for actuating the cord-knotter and 5 for actuating the cord-holder disk, together with a delay-surface 6 to hold these parts in position after they have been given their respective movements resulting from the gear-segments. It is also provided with the cam-groove 7 for imparting the necessary movement to the cord-stripper and knife arm 8. The knotter-pinion 9 is provided with the usual delay-surface 10; but instead of this surface being placed upon the lower or outer end of the pinion it is made upon the inner end for a purpose which will be described later. The knotter-shaft is journaled in the knotter-frame radially to the knotter-shaft 2, and the lower journal-box is provided with the usual cam for opening the loose jaw of the knotter, which is closed by a cam-spring in a well-known manner. The shaft 11 of the cord-holding mechanism is preferably journaled in the knotter-frame on a line tangential to a circle described from the axis of the knotter-shaft 2 for the purpose of giving room for freedom of action of the knotter and cord-holder pinions. On the upper end of this shaft is secured the holder-pinion 12 in such a position as to mesh with its segment of gear 5 on the cam-wheel 3, and the shaft is given one-third of a rotation each turn of the cam, the pinion being provided with three delay-surfaces, as shown in Fig. 7. The lower end of the holder-shaft is made triangular for a short portion, which ends in a collar 13, adapted to hold the shaft against upward movement when in operative position. The holder-disk 14 has a triangular central cavity 15, adapted to receive the triangular end of the shaft 11, the cavity being somewhat larger than the portion of the shaft it is designed to receive for the purpose of allowing a limited oscillating movement of the disk from a plane at right angles with the axial line of the shaft. The cavity is of a less depth than the length of that portion of the shaft it is designed to receive, and its horizontal bottom is adapted to vibrate upon the slightly-curved end of the shaft. It has three cord-receiving notches in its periphery, and they divide the disk into three segmental portions. One side of each cord-receiving notch is undercut or rounded and the upper portion of the same side is turned slightly upward. The opposite side of each notch is rounded over and downward and made slightly concave, as shown in Figs. 10 and 11. The disk is held in operative position upon the end of its driving-spindle by means of the plate-spring 16. The inner end of the plate-spring is formed with an opening 17, in which a boss 18 upon the under side of the disk 14 is loosely fitted. The opposite end of the plate-spring is provided with a hole for the reception of a bolt, by which it is secured to the foot portion 19 of the knotter-frame 1. The forward side of the plate-spring has an upturned portion 20, adapted to guide the cord downward in position to be received by the tier-hook. This upturned portion trends gradually downward and inward toward the disk for a short distance and then directly downward to form a short shoulder portion 21 to hold the cords against the cutting action of the knife. Extending inward from the shoulder portion is an upturned part 22, having its upper surface approximately on a level with the upper surface of the disk. This portion is for the purpose of preventing the end of the cord being pulled from the disk at or near the time of the cutting action of the knife. The cord-holder disk upon the under side of each segmental part is provided with curved corrugations, forming angular ribs that assist in preventing the slipping of the twine from between the disk and the plate-spring. The flat holding-surface of the plate-spring is continued in a circumferential direction a short distance from the end of part 22 to insure the safe gripping of the end of the cord. A stripping or clearing horn 23 extends rearward from the body of the spring, its function being to clear the disk of the short pieces of surplus twine. Near this horn and toward the part 19, to which the plate-spring is secured, is a curved upturned portion 24, and the body-surface is cut away, forming between the clearing-horn 23 and the upturned portion 24 a guiding-notch 25 to assist the needle in properly presenting the cord to the receiving-notch in the cord-holder disk. The knotter-frame 1 is provided with inward-projecting toe portions, to which is secured the breastplate in a well-known manner. The bundle-stripper is hooked directly into the upturned toe portions of the knotter-frame, and its upper looped part engages with a hook formed on the upper outward side of the knotter-frame, as shown in Figs. 1 and 2.

The operation of our invention is as follows: The needle passing through the slot in the breastplate and over the knife-arm and knotter-hook in the usual manner delivers the cord into the outer receiving-notch of the cord-holder disk, assisted by the guiding-piece 24 and notch 25 of the plate-spring. At or near the time the needle has reached the limit of its upward and outward movement, the segment-gearing 4 of the knotter-cam has engaged with the knotter-pinion 9. When the knotter-hook has been turned about one-fourth of a revolution, the segment-gear 5 upon the knotter-cam engages with the cord-holder pinion 12 and revolves the cord-holder disk one-third of a revolution toward the knotter-hook. The cord-holder disk in turning presses the twine, still held forward by the needle, between its ribbed under surface and the plate-spring. As the movement of the cord-holder disk upon the needle side of its axis is toward the knotter-hook, it carries the cord forward to meet the opening jaws of the knotter-hook as they are nearing the end of their rotation, the movements of these parts being so timed that the cord-holder disk begins its forward movement and gives up cord at the time that the knotter-hook has ceased to draw cord from that portion surrounding the bundle; otherwise it would compel the cord either to break or be drawn through the holding mechanism. The latter feature has been objectionable, as it necessitated a close adjustment and careful construction of these parts to render them serviceable. Our improved cord-holder renders just sufficient cord to the knotter to complete the knot without undue strain on the cord and ceases to render it just as the knife is being moved forward to sever the cords that have been drawn taut by the knotter-hook, the knife in its action being assisted by the shoulder 21 of the plate-spring, which holds the cords against the opposing force of the knife.

An important feature of our improved cord-holder is its perfect freedom of oscillation without friction to accommodate itself to the varying sizes of cord. It frequently happens that a large portion of the cord-strand is immediately followed by a much smaller strand and in such juxtaposition that while one is being held by one portion of the disk mechanism the other is brought in contact with another portion, and were it not for this oscillating feature the two strands would be held by unequal forces and the smaller one would be allowed to escape. Cord-holder disks somewhat similar in form to our invention have been constructed in such manner as to allow of a limited oscillation for the purpose described; but we believe that we are the first to place the disk loosely upon the end of the spindle and hold it thereto in the manner described.

Another feature of our invention is in connection with the construction of the knotter cam-wheel and knotter-pinion. It has been customary heretofore where a knotter cam-wheel was used to give motion to two sets of operating mechanisms by means of gear segments and pinions having delay-shoes that engage with delay-surfaces upon the cam to have two separate delay-surfaces upon the cam-wheel—one outside the circumference of each gear-segment. In our improved cam-wheel we have placed the single delay-surface between the two gear-segments in such manner as to act upon the delay surface and surfaces of the knotter-pinion and cord-holder pinion, respectively. By this construction we are enabled to materially reduce the diameter of the cam-wheel and lessen its cost of production.

It will be observed that by the construction of our knotter the working parts are brought close to the bundle, insuring a compactly-bound bundle, and when it is discharged it will move close to the disk and sweep away any surplus ends of twine or loose straws that might interfere with the perfect operating of the tying mechanism.

What we claim as our invention, and desire to secure by Letters Patent, is—

1. A cord-holder for grain-binders comprising the following elements: a disk, having cord-receiving notches and a central cavity, a driving-spindle that is loosely seated in said cavity in a manner to transmit motion to, and permit a limited vibration of said disk from a plane at right angles with the axis of the spindle, and a plate yieldingly held against the disk.

2. A cord-holder disk having cord-receiving notches in its periphery, and a roughened or corrugated under surface, a central angular cavity adapted to receive the angular end of a driving-spindle, said disk adapted to vibrate relative to the axis of the spindle in combination with a plate-spring that is yieldingly held against the roughened side of the disk.

3. A cord-holder disk provided with means for engaging the cord, and a central cavity that extends partially through the disk, in combination with a driving-spindle that is loosely seated in the cavity in a manner to transmit motion to the disk.

4. A cord-holder disk having cord-receiving notches in its periphery and a central cavity adapted to receive the end of a driving-spindle, said disk adapted to vibrate relative to the axis of the spindle.

5. In a cord-holder for grain-binders, a cord-holding disk, a disk-actuating spindle provided with an angular or squared end portion, provided with a convex end bearing, an abutting collar or shoulder, and means for driving said spindle.

6. In combination with a cord-holder disk having cord-receiving notches in its periphery, a plate yieldingly held against the disk, said plate provided with an upturned cord-guiding portion adapted to guide the cord into a receiving-notch, an upturned portion on the delivery side of the disk adapted to guide the cord downward and inward to meet the jaws of the knotting-hook and hold it against the cutting action of the knife, and having a portion of the upturned part extending across the delivery-notch when the succeeding notch is in a receiving position.

ROBERT C. LIVESAY.
   HENRY F. CRANDALL.
   EDWARD W. BURGESS.

Witnesses:
 EDWARD F. OTTO,
 WM. F. DUMMER.